US006980389B1

(12) United States Patent
Kupferman

(10) Patent No.: US 6,980,389 B1
(45) Date of Patent: Dec. 27, 2005

(54) DISK DRIVE HAVING A DISK INCLUDING A SERVO BURST PATTERN HAVING A NORMAL SERVO BURST FIELD AND A QUADRATURE SERVO BURST FIELD

(75) Inventor: Hanan Kupferman, Diamond Bar, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 10/789,675

(22) Filed: Feb. 27, 2004

(51) Int. Cl.$^7$ ............................................. G11B 5/596
(52) U.S. Cl. ................................................ 360/77.08
(58) Field of Search ........................ 360/31, 75, 77.01, 360/77.02, 77.08, 78.04, 78.14

(56) References Cited

U.S. PATENT DOCUMENTS

| 5,600,506 | A | * | 2/1997 | Baum et al. ............. 360/78.14 |
| 5,717,538 | A | * | 2/1998 | Cheung et al. .......... 360/77.08 |
| 5,801,897 | A | * | 9/1998 | Kanda et al. ............ 360/78.14 |
| 5,923,492 | A |   | 7/1999 | Liikanen |
| 6,043,952 | A |   | 3/2000 | Liikanen |
| 6,157,511 | A |   | 12/2000 | Liikanen |
| 6,243,223 | B1 |  | 6/2001 | Elliott et al. |
| 6,243,224 | B1 |  | 6/2001 | Sacks et al. |
| 6,366,423 | B1 |  | 4/2002 | Ahn |
| 6,426,845 | B1 |  | 7/2002 | Sacks et al. |
| 6,760,184 | B1 |  | 7/2004 | Cunningham |
| 2002/0114101 | A1 | | 8/2002 | Guzik et al. |

* cited by examiner

Primary Examiner—David Hudspeth
Assistant Examiner—Mitchell Slavitt
(74) Attorney, Agent, or Firm—Alan W. Young, Esq.

(57) ABSTRACT

A disk drive has a sampled servo system controller and a disk. The disk has a plurality a plurality servo burst fields, the plurality of servo burst field including first and second normal burst fields, and first and second quadrature burst fields. A portion of the first quadrature burst field is circumferentially contiguous with the first normal burst field and spans a portion of a radial extent of the first normal burst field. The second normal burst field is radially aligned with and away from the first normal burst field and spans a portion of a radial extent of the first quadrature burst field. The second quadrature burst field is radially aligned with and away from the first quadrature burst field and spans a portion of a radial extent of the second normal burst field. The first normal burst field and the first quadrature burst field have a same first phase and the second normal burst field and the first quadrature burst field have a same second phase. The first phase is different than the second phase.

21 Claims, 5 Drawing Sheets

DISK DRIVE HAVING A DISK INCLUDING A SERVO BURST PATTERN HAVING A NORMAL SERVO BURST FIELD AND A QUADRATURE SERVO BURST FIELD

BACKGROUND OF THE INVENTION

1. Field of the Invention

The present invention relates to disk drives and to the pattern of the servo burst fields written to disks used in such disk drives.

2. Description of the Prior Art and Related Information

In a conventional disk drive, each recording surface of each magnetic disk contains a plurality of concentric data tracks angularly divided into a plurality of data sectors. In addition, special servo information is provided on this disk or another disk to determine the position of the head. The most popular form of servo is called "embedded servo" wherein the servo information is written on this disk in a plurality of servo sectors that are angularly spaced from one another and interspersed between data sectors around the track. Each servo sector generally comprises a track identification (ID) field and a group of servo bursts that the servo control system samples to align the transducer head with or relative to a particular data track. Each servo burst is conventionally formed from a series of magnetic transitions defined by an alternating pattern of magnetic domains.

The servo control system moves the transducer toward a desired track during a coarse "seek" mode using the track ID field as a control input. Once the transducer head is generally over the desired track, the servo control system uses the servo bursts to keep the transducer head over that track in a fine "track following" mode. The transducer generally reads the servo bursts to produce a Position Error Signal (PES) that is 0 when the transducer is at a particular radial position. The position where the PES=0 may or may not be at the data track center, depending on the magnetic characteristics of the transducer, the arrangement of the servo bursts, and the formula used to calculate the PES.

Conventionally, the servo burst written by the servo track writer include groups of four discrete servo bursts that are identified as A, B, C and D and that are disposed at predetermined positions relative to a track centerline. The A and B bursts may be thought of as in-phase and the C and D bursts are placed in "quadrature" with the A and B bursts, in that the edges of the C and D bursts may be aligned with the centers of the A and B bursts or may span a portion of a radial extent of the A and B bursts. With four bursts A, B, C, D positioned in quadrature, there are two burst pair centerlines (also called Track Center or TC herein) per data track pitch, i.e. one burst pair centerline every 50% of a data track pitch. The read/write transducer, therefore, will always pass over an A/B pair or a C/D pair of servo bursts because it is always within 25% of a data track pitch from an A/B or C/D burst pair centerline.

However, competitive pressures are such that disk drive designers continually seek to improve yield and capacity. The servo information conveyed by the servo bursts, although essential to the operation of the drive, is generally considered to be overhead. The area of the disk recording surface that is occupied by servo bursts cannot be used to record user data. Some of this recording surface real estate conventionally occupied by the four embedded A, B, C and D servo burst fields would be better utilized for recording user data. Improving the servo burst format by reducing the amount of the area of the disk recording surface that is occupied by the servo bursts would, in turn, correspondingly improve both yield and efficiency.

SUMMARY OF THE INVENTION

According to an embodiment thereof, the present invention is a disk drive having a sampled servo system controller and a disk wherein the disk has a plurality of servo burst fields. Each of the plurality of servo burst fields may include a first normal burst field; a first quadrature burst field, a portion of the first quadrature burst field being circumferentially contiguous with the first normal burst field and spanning a portion of a radial extent of the first normal burst field; a second normal burst field, the second normal burst field being radially aligned with and away from the first normal burst field, the second normal burst field spanning a portion of a radial extent of the first quadrature burst field, and a second quadrature burst field, the second quadrature burst field being radially aligned with and away from the first quadrature burst field, the second quadrature burst field spanning a portion of a radial extent of the second normal burst field. The first normal burst field and the first quadrature burst field have a same first phase, the second normal burst field and the second quadrature burst field have a same second phase, the first phase being different than the second phase.

The disk may define a plurality of tracks defining a track width, and each of the first and second normal burst fields and each of the first and second quadrature burst fields may span a radial extent that is greater than half of the track width. The second quadrature burst field may be contiguous with the first quadrature burst field. The disk drive includes a write transducer having a write transducer width. The width of the first and second normal burst fields and the width of the first and second quadrature burst fields may be dictated by the write transducer width. The first and second normal burst fields and the first and second quadrature burst fields may not be trimmed after being written to the disk by the write transducer. The disk drive may include a read transducer and the sampled servo system controller may include a Discrete Fourier Transform (DFT)-type demodulator coupled to the read transducer. The DFT-type demodulator may be configured to generate a servo correction signal that includes a servo correction magnitude and a servo correction direction from a phase information derived from the first normal and first quadrature burst fields read by the read transducer. The disk may be configured to enable the sampled servo system controller to determine a servo correction signal that includes a servo correction magnitude and a servo correction direction from a reading of only two circumferentially adjacent servo burst fields. The difference between the first phase and the second phase may be, for example, 180 degrees or about 180 degrees.

According to another embodiment thereof, the present invention is a disk drive having a sampled servo system controller and a disk that has a plurality of servo burst fields. The plurality of servo burst fields may include a first normal burst field; a first quadrature burst field, a portion of the first quadrature burst field being circumferentially contiguous with the first normal burst field and spanning a portion of a radial extent of the first normal burst field; a second normal burst field, the second normal burst field being radially aligned with and away from the first normal burst field, the second normal burst field spanning a portion of a radial extent of the first quadrature burst field, and a second quadrature burst field, the second quadrature burst field being radially aligned with and away from the first quadrature burst field, the second quadrature burst field spanning a portion of a radial extent of the second normal burst field. The first normal burst field may have a first phase and the second normal burst field may have a second phase that is different than the first phase, and the first quadrature burst field may have a third phase and the second quadrature burst field may have a fourth phase that is different than the third phase.

According to further embodiments, the first phase may be the same as the third phase and the second phase may be the same as the fourth phase. The second phase may be the same as the third phase and the first phase may be the same as the fourth phase. The polarity of the first normal burst field may be opposite to the polarity of the second normal burst field and the polarity of the first quadrature burst field may be opposite to the polarity of the second quadrature burst field. The disk may define a plurality of tracks defining a track width, and each of the first and second normal burst fields and each of the first and second quadrature burst fields may span a radial extent that is greater than half of the track width. The second quadrature burst field may be contiguous with the first quadrature burst field. The disk drive may also include a write transducer having a write transducer width and the width of the first and second normal burst fields and the width of the first and second quadrature burst fields may be dictated by the write transducer width. The first and second normal burst fields and the first and second quadrature burst fields may not be trimmed after being written to the disk by the write transducer. The sampled servo system controller may include a Discrete Fourier Transform (DFT)-type demodulator coupled to the read transducer. The DFT-type demodulator may be configured to generate a servo correction signal that includes a servo correction magnitude and a servo correction direction from the phase information derived from the first normal and first quadrature burst fields read by the read transducer. The disk may be configured to enable the sampled servo system controller to determine a servo correction signal that includes a servo correction magnitude and a servo correction direction from a reading of only two circumferentially adjacent servo burst fields. The difference between the first phase and the second phase may be about 180 degrees and the difference between the third phase and the fourth phase may be about 180 degrees. Each of the first and second normal burst fields may be circumferentially adjacent to at least one of the first and second quadrature burst fields.

DETAILED DESCRIPTION

Figure 1:
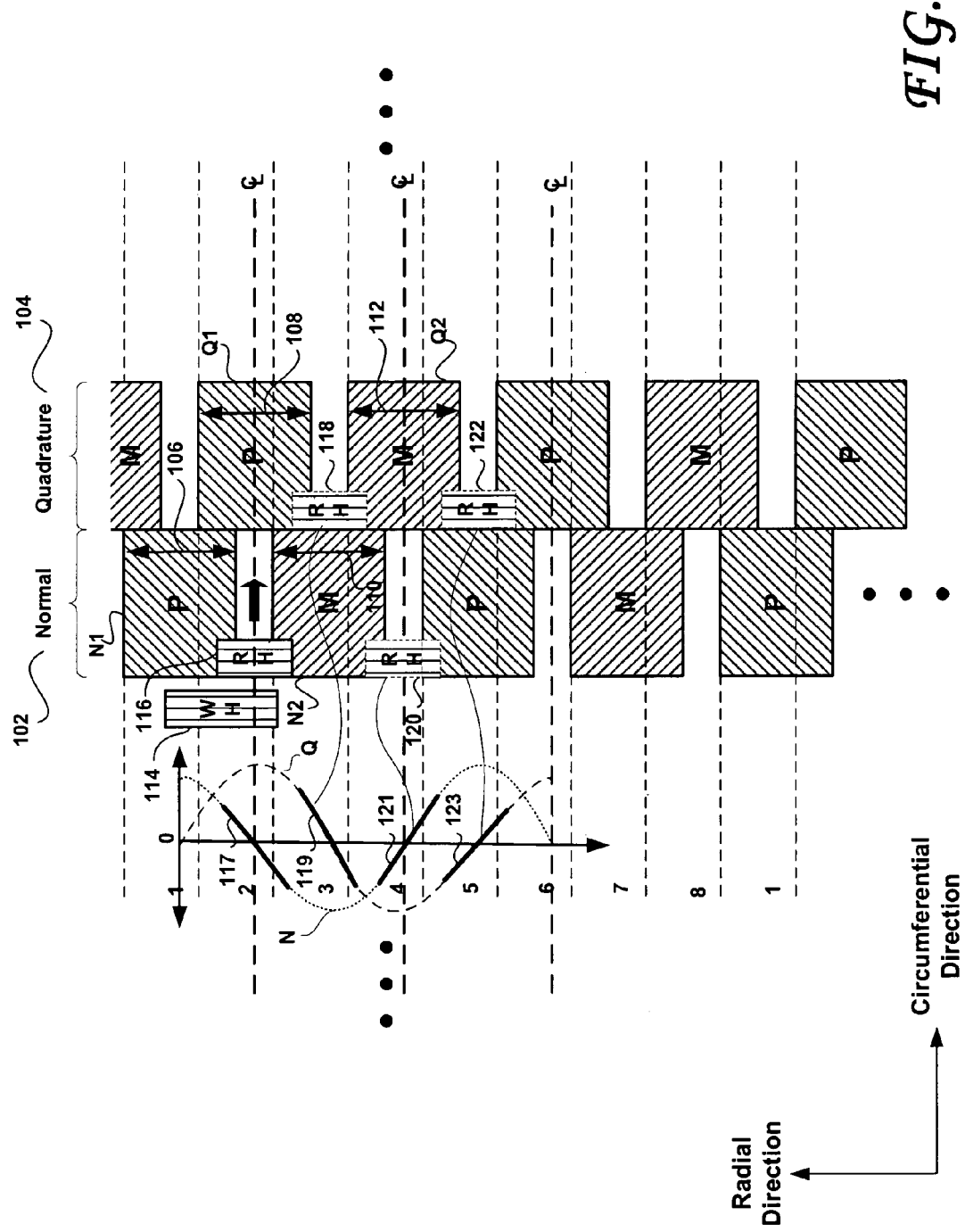
FIG. 1 shows the arrangement of normal and quadrature servo burst fields recorded on a disk of a disk drive according to an embodiment of the present invention.

FIG. 1 shows the arrangement of normal and quadrature servo burst fields recorded on a disk of a disk drive having a sampled servo system controller, according to an embodiment of the present invention. The servo burst fields include radially aligned normal burst fields 102 and radially aligned quadrature burst fields 104. Radially adjacent normal burst fields 102 have different phases and radially adjacent quadrature burst fields 104 have different phases. According to an embodiment of the present invention, the normal and quadrature burst fields 102, 104 include servo burst fields having a first phase P and a second phase M. According to an embodiment of the present invention, the difference between the first and second phases P and M may be 180 degrees. As shown in FIG. 1, the servo burst fields written on the disk may include a first normal burst field N1 of the first polarity P and a first quadrature burst field Q1, also of the first polarity P. A portion of the first quadrature burst field Q1 may be circumferentially contiguous with the first normal burst field N1 and may span a portion of a radial extent 106 of the first normal burst field N1. A second normal burst field N2 of polarity M may be written to the disk, such that it is radially aligned with and away from the first normal burst field N1 of polarity P. Moreover, the second normal burst field N2 may span a portion of the radial extent 108 of the first quadrature burst field Q1. A second quadrature burst field Q2 of polarity M may be written to the disk, such that it is radially aligned with and away from the first quadrature burst field Q1. The second quadrature burst field Q2 may span a portion of a radial extent 110 of the second normal burst field N2. According to another embodiment of the present invention, the second normal burst field N2 may be contiguous with the first normal burst field N1 and the second quadrature burst field Q2 may be contiguous with the first quadrature burst field Q1.

Also shown in FIG. 1 are the read and write transducers of the disk drive's slider that is coupled to the actuator that is radially swept over the recording surface of the disk during writing and reading operations. The write transducer is shown at 114 and the read transducer is shown at reference numeral 116. The write transducer 114 defines a write transducer width and the widths 106, 110 of the first and second normal burst fields N1, N2 and the widths 108, 112 of the first and second quadrature burst fields Q1 and Q2 are dictated by the write transducer width. Such burst fields may advantageously be carried out by writing the servo burst fields using a technique that may be called "Write Whole Burst" (WWB).

Conventionally, A, B, C, D servo bursts (such as shown, for example, in U.S. Pat. No. 6,157,511) are exactly 1 track wide or, for example, there may be three sets of servo bursts for every 1½ tracks. This may be achieved by composing the burst out of two servo burst field portions, each servo burst field portion being ½ track wide. Indeed, each such servo burst field A, B, C, D may be recorded in two steps, separated exactly by ½ track. In this manner, the write transducer writes one servo burst field and also "trims" (if necessary) the unnecessary servo burst field portions everywhere else. However, a drawback of this method is that when the read transducer being used by the servo is narrow (for example 50% of the track width), when the head moves across the servo bursts fields, there will be significant zones in which there are no changes in the magnetic field. When the read transducer does not detect changes in the magnetic fields as it sweeps over the embedded servo patterns, the servo is unable to derive an accurate PES signal from the signal induced within the read transducer.

According to an embodiment of the present invention, this issue may be overcome by using the width of the write transducer 114 and the read transducer 116 to write and read servo burst fields that are arranged such that the signal generated by the read transducer 116 as it travels over the servo burst fields all or most of the time exhibits variations and thus is able to convey positional information. This may be carried out by writing the servo burst fields only once, the width of the written servo burst fields being defined by the width of the write transducer 114. The disk defines a plurality of concentric tracks and each of the tracks defines a track width. In FIG. 1, the tracks are shown delimited by dashed lines and are labeled 1, 2, 3, 4, 5, 6, 7, 8, 1 . . . . For example, the width of the write transducer may be 0.7 of the width of the tracks 1, 2, 3, 4, 5 . . . The other servo burst fields may be skipped such that no trimming takes place. In this manner, each servo burst field is laid down onto the recording surface of the disk fully formed in a single pass. According to an embodiment of the present invention, each of the first and second normal burst fields N1, N2 and each of the first and second quadrature burst fields Q1, Q2 spans a radial extent that is greater than half of the width of the tracks 1, 2, 3, 4, 5 . . . and the read transducer 116 may have a width that is, for example, 0.6 of the width of the tracks.

Figure 2:
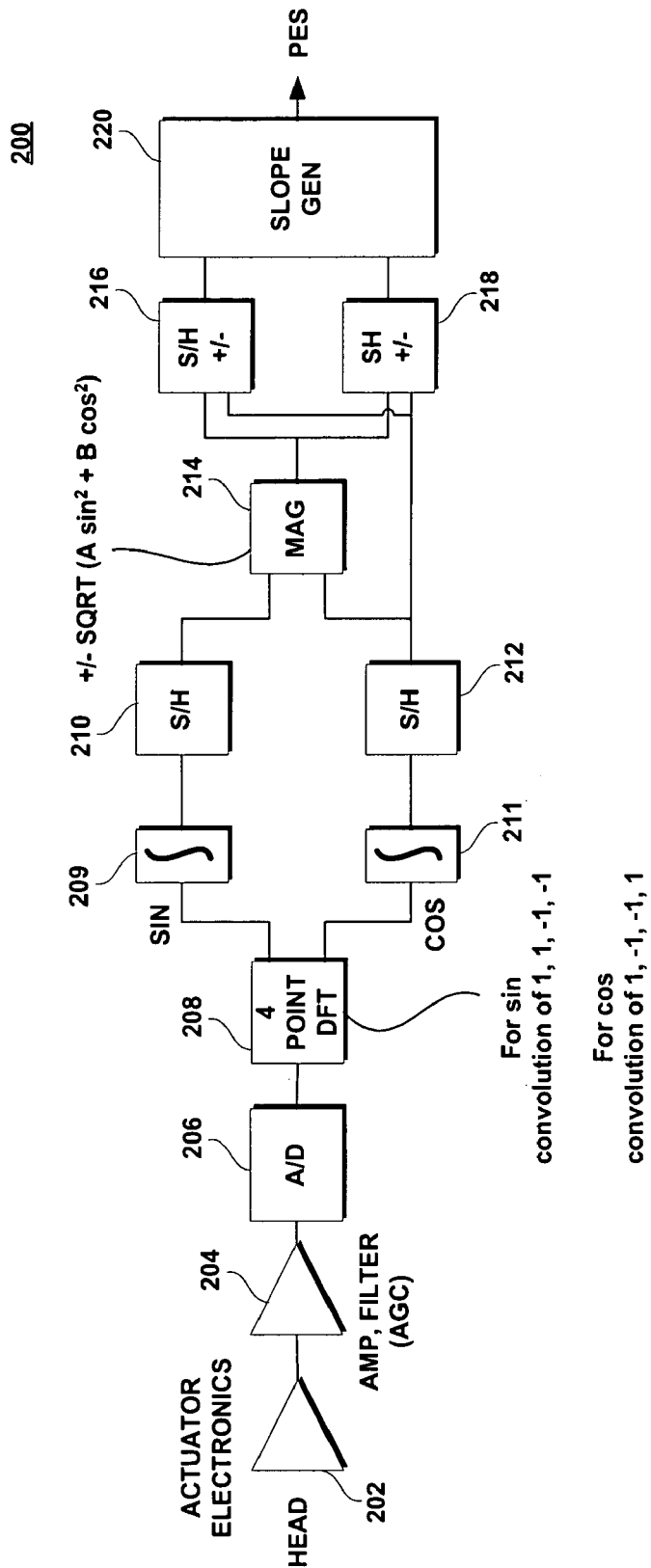
FIG. 2 is a block diagram illustrating aspects of a DFT-type demodulator suitable for reading and processing the normal and quadrature servo burst fields to generate a Position Error Signal (PES), according to an embodiment of the present invention.

According to embodiments of the present invention, the embedded servo burst fields described above are configured to enable the sampled servo system controller of the disk drive to determine a servo correction signal (Position Error Signal or PES) that includes a servo correction magnitude and a servo correction direction from a reading of only two circumferentially adjacent servo burst fields, such as, for example, the first normal burst field N1 and first quadrature burst field Q1 read by the read transducer 116. FIG. 2 is a block diagram illustrating aspects of a demodulator suitable for reading and processing the normal and quadrature servo burst fields of FIG. 1 to generate such a PES, according to an embodiment of the present invention. According to an embodiment of the present invention, the read transducer 116 of the slider reads the servo bursts that are laid down on the recording surface of the disk, such as shown in FIG. 1. The read signal may then be amplified in the actuator electronics shown at 202, whereupon the amplified signal is fed to the read channel where it may be amplified and filtered, as shown at 204. The gain may be regulated by an automatic gain control. The amplified, filtered and gain regulated signal output from 204 may then be digitized and fed to a 4-point Discrete Fourier Transform (DFT) where the signal may be convoluted by 1, 1, −1, −1 to obtain the sine component of the signal and convoluted by 1, −1, −1, 1 to obtain the cosine component of the signal. The sine and cosine components output from the 4-point DFT 208 are then integrated in integrators 209, 211 and each be fed to a sample and hold S/H 210, 212, respectively. The output of the S/H 210, 212 are then further processed to derive therefrom the magnitude of the signal. That is, the MAG unit carries out a square root operation upon the sum of the squares of the sine and cosine components of the signal. The calculated magnitude is then sampled and held at 216, 218, and the outputs thereof are fed to the slope generator 220 to derive the PES signal. The cosine value carries the polarity information of the PES signal. When the signal is in phase (the cos=1), then no phase inversion is necessary. When the signal is out of phase (180 degrees, cos=−1), then the PES signal is inverted. This provides the direction of the correction necessary to move the read/write transducer closer to the track centerline and to enable continued track following operations. The slope generator 220 derives the PES signal from the slopes of the N and Q (and −N and −Q) signals, as detailed below.

Figure 3:
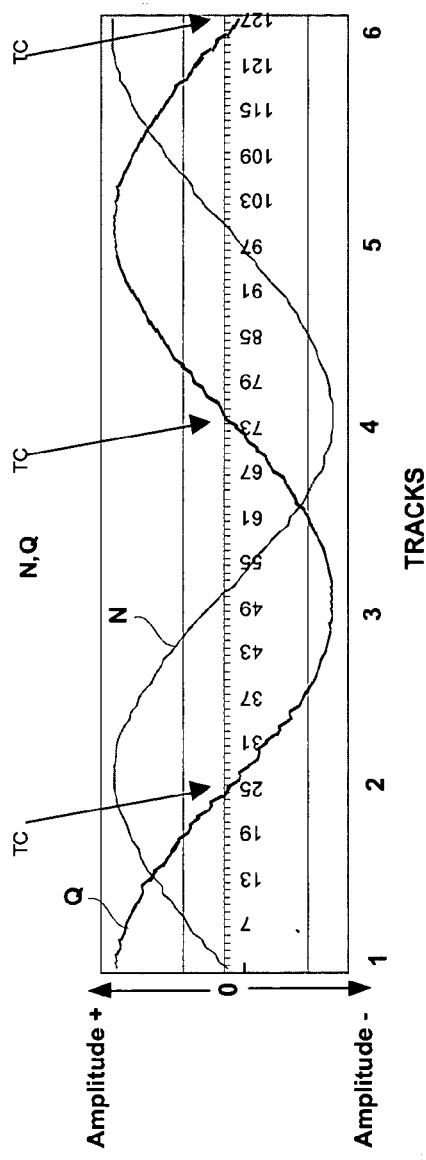
FIG. 3 shows several normal and quadrature waveforms from which a PES signal may be derived, according to an embodiment of the present invention.
Figure 3:
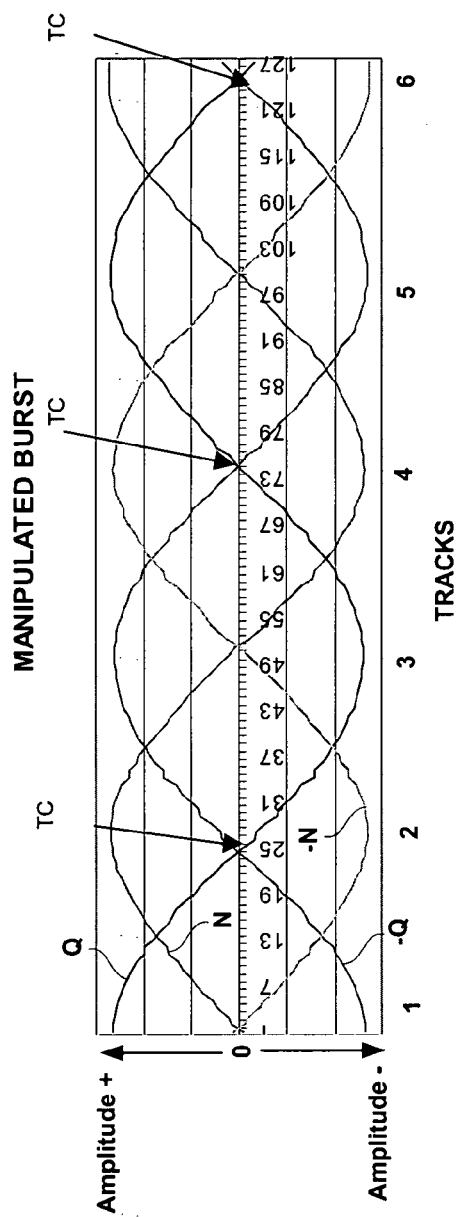

When the normal and quadrature servo bursts shown in FIG. 1 are equal and exactly 180 out of phase relative to one another, cancellation occurs when the read transducer 116 is exactly over the track centerline CL (or track center TC, as shown in FIG. 3), as the signals induced upon the read transducer 116 cancel each other, as they are exactly 180 degrees out of phase. The magnitude of the resultant PES signal is then 0. Moreover, under ideal conditions, when the read transducer is only over a single servo burst, the signal at the demodulator is either 0 or 180 degrees, depending upon whether the read transducer is over a P or M burst. When the signals at the demodulator are not exactly 0 or 180 degrees, the servo bursts may not have been written properly and the difference between their phases may be other than 0 or 180 degrees. In that case, an error may occur and the PES signal may not be correct.

Under ideal situations, the signal at the demodulator (in the case when no cancellation takes place) is either 0 or 180 degrees. When the signal at the demodulator is different than +180 degrees or −180 degrees, then the bursts were not written properly (+180/0/− 180) and an error may occur. In this case, a correction should be applied to avoid generating an incorrect PES. From trigonometry, A Sin(wt+Φ) =A*SinWt*CosΦ+A*CosWt*SinΦ, where W=2Πf, f denotes frequency and Φ denotes the phase shift. When Φ=0, this expression evaluates to A*Sin(Wt+0) =A*SinWt*1+A*CosWt*0=A*SinWt. If a phase shift Φ takes place then A*Sin(Wt+Φ)=A*SinWt*CosΦ+A* CosWt*SinΦ, where CosΦ(=K1) and SinΦ(=K2) The sin and cos values may be calculated from a series expansion or the values may be looked up in a table, for example. Therefore, A*Sin(Wt+Φ)=A*K1*SinWt+A*K2*CosWt. The demodulator provides the phase as well as the Sin and the Cos values that were modified by K1 and K2 due to the phase shift. Having AK1(SinWt) and Ak2 (CosWt) and the phase shift Φ, allows one to calculate the sinΦ and cosΦ and to obtain the actual value of A, thereby generating the undistorted value due to phase shift of the PES.

The read transducer 116 effectively performs a summation of the contributions of the servo burst fields it passes over. When the read transducer 116 is in the position shown in FIG. 1; that is, on the centerline CL between the normal N1 and N2 servo burst fields, the contributions of N1 and N2 to the N signal cancel each other out, as the polarities of N2 and N2 are opposite. As shown in FIG. 1, the N signal (the signal generated by the read transducer 116 when it is over the normal servo burst fields 102) is small or zero when the read transducer 116 is on or near the centerline CL. In contrast, when the read transducer continues on the centerline CL and passes over the quadrature servo burst fields 104, it will be directly over (and only over) servo burst field Q1. The resulting Q signal (the signal generated by the read transducer 116 when it is over the quadrature servo burst fields 104) will be at its maximum. The Q signal exhibits its zero crossings when the read transducer 116 is exactly between the Q1 and Q2 servo burst fields, as the polarities thereof are opposite. The resultant N and Q signals are shown in FIG. 1, aligned with the normal and quadrature servo burst fields 102 and 104.

The arrangement of the servo burst fields according to the embodiments of the preset invention as shown in FIG. 1 enables accurate PES generation irrespective of the position of the read transducer over the servo burst fields. As shown in FIG. 1, the N and Q signals provide nearly linear slopes from which the demodulator is able to derive accurate positional information, across the range of possible read transducer positions, while avoiding the disadvantages associated with the local maxima and minima of the N and Q signals, from which little positional information may be derived. The N and Q signals are also shown in the top graph of FIG. 2. The bottom graph of FIG. 2 reproduces these N and Q signals, and also shows the –N and –Q signals for reference.

As shown in FIG. 1, when the read transducer 116 is located somewhere between N1 and N2, the segment of the N signal in bold and identified at reference numeral 117 may be used to calculate the PES, as it provides the demodulator with a nearly linear indication of the radial position of the head over these two servo burst fields. When the read transducer is at the position shown at 118; that is, somewhere between Q1 and Q2, the segment of the Q signal identified at reference numeral 119 may be used to accurately derive the PES signal. Likewise, when the read transducer is located somewhere close to the position shown at 120, the segment of the N signal referenced at 121 may be used to generate the PES signal. Similarly, when the read transducer is located at somewhere near the position shown at 122, the segment of the Q signal referenced at 123 may be used to generate the PES signal. Each of these segments 117, 119, 121 and 123 are nearly linear in their extent and are thus able to be used by the demodulator as the basis for generating reliable positional information, through the read transducer carrying out the summation of the contributions of each of the servo burst fields it passes over.

Figure 4:
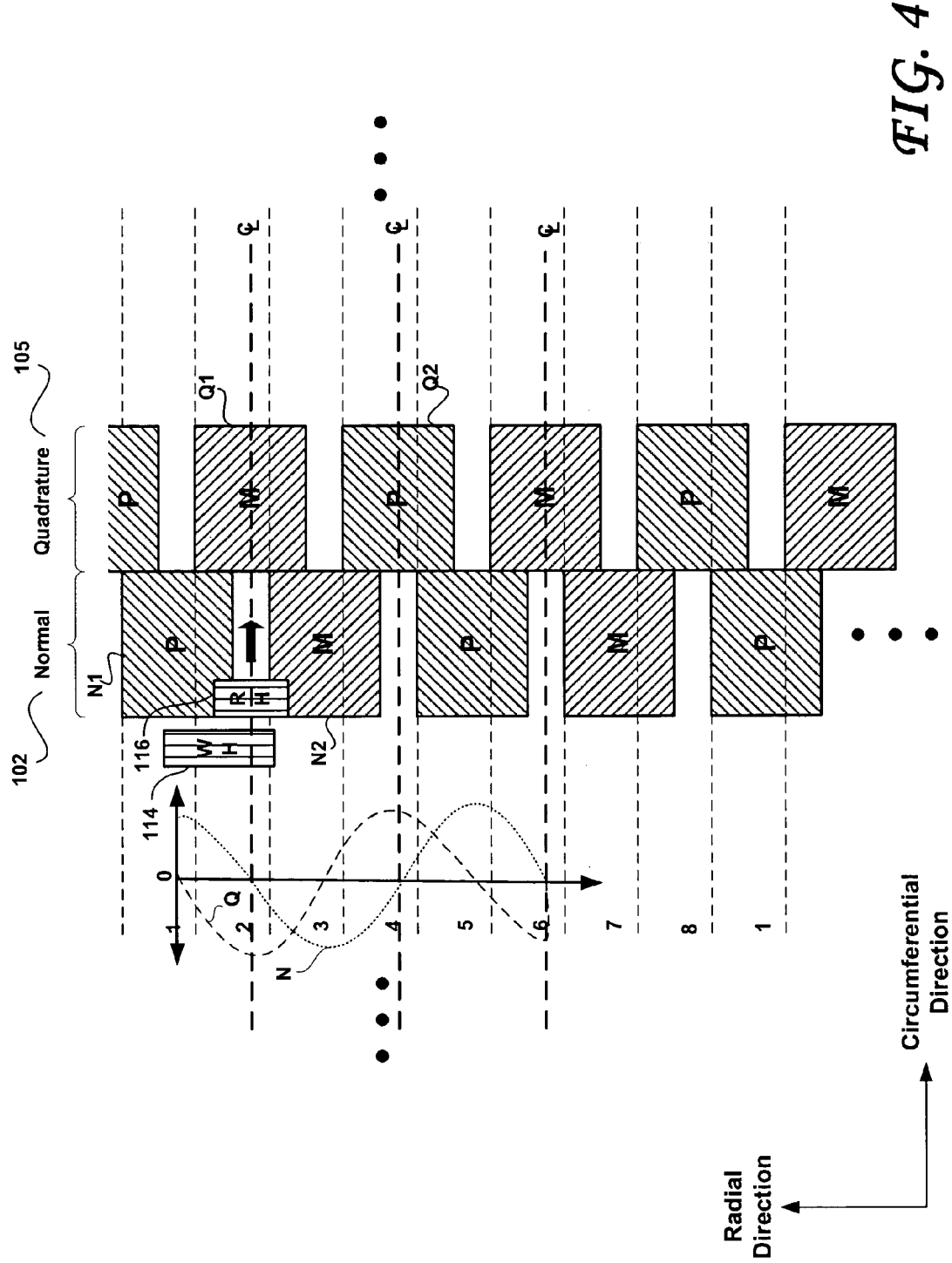
FIG. 4 shows the arrangement of normal and quadrature servo burst fields recorded on a disk of a disk drive according to another embodiment of the present invention.

FIG. 4 shows the arrangement of normal and quadrature servo burst fields recorded on a disk of a disk drive according to another embodiment of the present invention. As shown, FIG. 4 is similar to FIG. 1, but for the arrangement of the quadrature burst fields 105. As shown, the quadrature bursts 105 need not be arranged such that N1 and Q1 have the same polarity and such that N2 and Q2 have the same polarity. As shown in FIG. 4, embodiments of the present invention require only that the polarities of next adjacent normal burst fields 102 alternate (e.g., P, M, P, M . . . ) and that the polarities of next adjacent quadrature burst fields 105 alternate (e.g., M, P, M, P . . . ).

Figure 5:
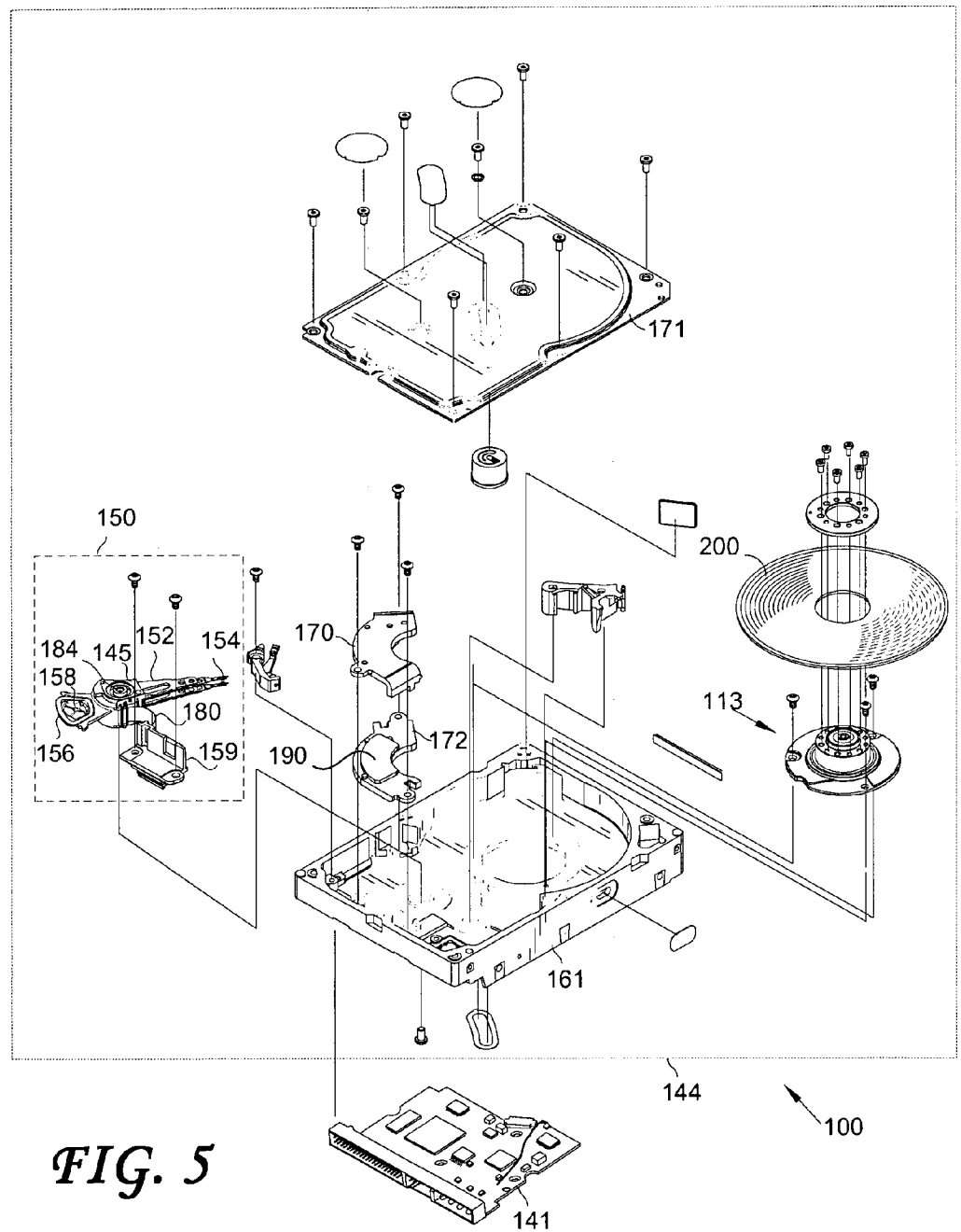
FIG. 5 is an exploded view of a magnetic disk drive according to an embodiment of the present invention.

FIG. 5 shows the principal components of a magnetic disk drive 100 according to an embodiment of the present invention. With reference to FIG. 5, the disk drive 100 comprises a head disk assembly (HDA) 144 and a printed circuit board assembly (PCBA) 141. The HDA 144 includes a base 161 and a cover 171 attached to the base 161 that collectively house one or more disks 200 (only one disk 200 is shown in FIG. 5), a spindle motor 113 attached to the base 161 for rotating the disk 200, a head stack assembly (HSA) 150, and a pivot bearing cartridge 184 that rotatably supports the HSA 150 on the base 161. The disk shown at 200 in FIG. 1 is provided with embedded servo patterns as shown at FIG. 1 and/or as described above. The spindle motor 113 rotates the disk 200 at a constant angular velocity. The HSA 150 comprises a swing-type or rotary actuator assembly 152, at least one head gimbal assembly that includes the suspension assembly 154, a flex circuit cable assembly 180 and a flex bracket 159. The rotary actuator assembly 152 includes a body portion 145, at least one actuator arm cantilevered from the body portion 145, and a coil assembly including a coil 156 cantilevered from the body portion 145 in an opposite direction from the actuator arm(s). A bobbin 158 may be attached to the inner periphery of the coil assembly to stiffen the coil assembly. The actuator arm(s) support respective suspension assembly(ies) that, in turn, support read/write transducer(s) (116, 114 shown in FIG. 1) for reading and writing to the disk 200. The HSA 150 is pivotally secured to the base 161 via the pivot-bearing cartridge 184 so that the read/write transducer(s) at the distal end of the suspension assembly(ies) may be moved over the recording surface(s) of the disk(s) 200. The pivot-bearing cartridge 184 enables the HSA 150 to pivot about its pivot axis. The "rotary" or "swing-type" actuator assembly rotates on the pivot bearing cartridge 184 between limited positions, and the coil assembly that extends from one side of the body portion 145 interacts with one or more permanent magnets 192 mounted to back irons 170, 172 to form a voice coil motor (VCM). When a driving voltage is applied to the VCM, torque is developed that causes the HSA 150 to pivot about the actuator pivot axis and causes the read/write transducer(s) to sweep radially over the disk 200.

What is claimed is:

1. A disk drive having a sampled servo system controller and a disk wherein the disk has a plurality of servo burst fields, the plurality of servo burst fields comprising:
   a first normal burst field;
   a first quadrature burst field, a portion of the first quadrature burst field being circumferentially contiguous with the first normal burst field and spanning a portion of a radial extent of the first normal burst field;
   a second normal burst field, the second normal burst field being radially aligned with and away from the first normal burst field, the second normal burst field spanning a portion of a radial extent of the first quadrature burst field, and
   a second quadrature burst field, the second quadrature burst field being radially aligned with and away from the first quadrature burst field, the second quadrature burst field spanning a portion of a radial extent of the second normal burst field,
   wherein the first normal burst field and the first quadrature burst field have a same first phase, the second normal burst field and the second quadrature burst field have a same second phase, the first phase being different than the second phase.

2. The disk drive of claim 1, wherein the disk defines a plurality of tracks defining a track width, and wherein each of the first and second normal burst fields and each of the first and second quadrature burst fields spans a radial extent that is greater than half of the track width.

3. The disk drive of claim 1, wherein the second quadrature burst field is contiguous with the first quadrature burst field.

4. The disk drive of claim 1, further comprising a write transducer having a write transducer width and wherein a width of the first and second normal burst fields and a width of the first and second quadrature burst fields are dictated by the write transducer width.

5. The disk drive of claim 1, wherein the first and second normal burst fields and the first and second quadrature burst fields are not trimmed after being written to the disk by the write transducer.

6. The disk drive of claim 1, further comprising a read transducer and wherein the sampled servo system controller includes a Discrete Fourier Transform (DFT)-type demodulator coupled to the read transducer, the DFT-type demodulator being configured to generate a servo correction signal that includes a servo correction magnitude and a servo correction direction from a phase information derived from the first normal and first quadrature burst fields read by the read transducer.

7. The disk drive of claim 1, wherein the disk is configured to enable the sampled servo system controller to determine a servo correction signal that includes a servo correction magnitude and a servo correction direction from a reading of only two circumferentially adjacent servo burst fields.

8. The disk drive of claim 1, wherein a difference between the first phase and the second phase is 180 degrees.

9. The disk drive of claim 1, wherein each of the first and second normal burst fields is circumferentially adjacent to at least one of the first and second quadrature burst fields.

10. A disk drive having a sampled servo system controller and a disk wherein the disk has a plurality of servo burst fields, the plurality of servo burst fields comprising:
a first normal burst field;
a first quadrature burst field, a portion of the first quadrature burst field being circumferentially contiguous with the first normal burst field and spanning a portion of a radial extent of the first normal burst field;
a second normal burst field, the second normal burst field being radially aligned with and away from the first normal burst field, the second normal burst field spanning a portion of a radial extent of the first quadrature burst field; and
a second quadrature burst field, the second quadrature burst field being radially aligned with and away from the first quadrature burst field, the second quadrature burst field spanning a portion of a radial extent of the second normal burst field,
wherein the first normal burst field has a first phase and the second normal burst field has a second phase that is different than the first phase, and wherein the first quadrature burst field has a third phase and the second quadrature burst field has a fourth phase that is different than the third phase.

11. The disk drive of claim 10, wherein the first phase is the same as the third phase and the second phase is the same as the fourth phase.

12. The disk drive of claim 10, wherein the second phase is the same as the third phase and the first phase is the same as the fourth phase.

13. The disk drive of claim 10, wherein a polarity of the first normal burst field is opposite to a polarity of the second normal burst field and wherein a polarity of the first quadrature burst field is opposite to a polarity of the second quadrature burst field.

14. The disk drive of claim 10, wherein the disk defines a plurality of tracks defining a track width, and wherein each of the first and second normal burst fields and each of the first and second quadrature burst fields spans a radial extent that is greater than half of the track width.

15. The disk drive of claim 10, wherein the second quadrature burst field is contiguous with the first quadrature burst field.

16. The disk drive of claim 10, further comprising a write transducer having a write transducer width and wherein a width of the first and second normal burst fields and a width of the first and second quadrature burst fields are dictated by the write transducer width.

17. The disk drive of claim 10, wherein the first and second normal burst fields and the first and second quadrature burst fields are not trimmed after being written to the disk by the write transducer.

18. The disk drive of claim 10, further comprising a read transducer and wherein the sampled servo system controller includes a Discrete Fourier Transform (DFT)-type demodulator coupled to the read transducer, the DFT-type demodulator being configured to generate a servo correction signal that includes a servo correction magnitude and a servo correction direction from a phase information derived from the first normal and first quadrature burst fields read by the read transducer.

19. The disk drive of claim 10, wherein the disk is configured to enable the sampled servo system controller to determine a servo correction signal that includes a servo correction magnitude and a servo correction direction from a reading of only two circumferentially adjacent servo burst fields.

20. The disk drive of claim 10, wherein a difference between the first phase and the second phase is about 180 degrees and wherein a difference between the third phase and the fourth phase is about 180 degrees.

21. The disk drive of claim 10, wherein each of the first and second normal burst fields is circumferentially adjacent to at least one of the first and second quadrature burst fields.

* * * * *